March 2, 1948. P. E. RIVEST 2,436,899
CIRCULAR CUTTER
Filed Dec. 5, 1945
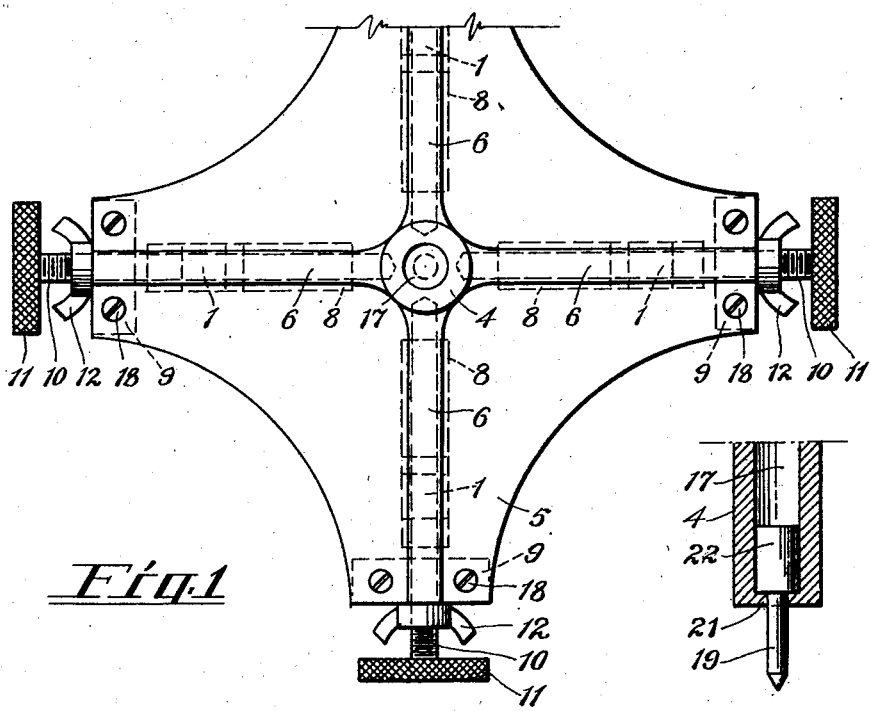
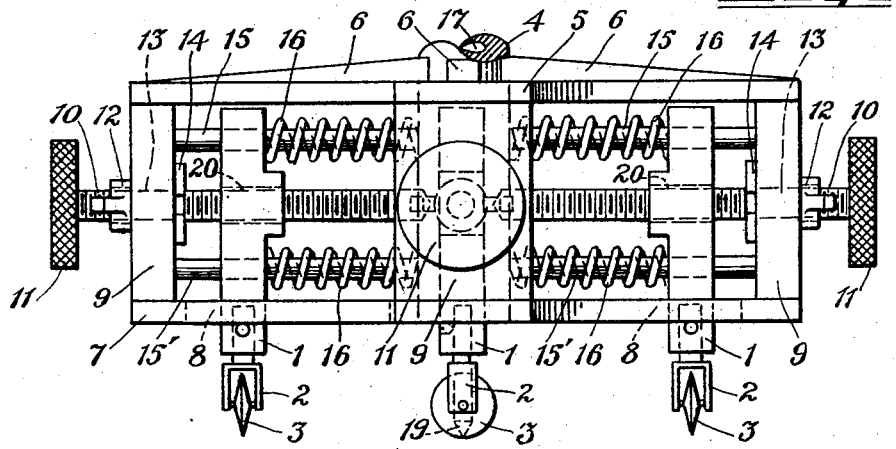
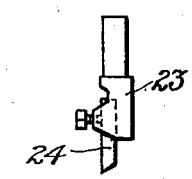
Inventor
PAUL EUCLID RIVEST
PER.
Chas. Kraissl
Attorney Patented Mar. 2, 1948

2,436,899

UNITED STATES PATENT OFFICE 2,436,899

CIRCULAR CUTTER

Paul Euclid Rivest, London, Ontario, Canada

Application December 5, 1945, Serial No. 632,992

4 Claims. (Cl. 164—71)

This invention relates generally to sheet metal cutters used in cutting circular holes or circular sections of comparatively large diameters.

The primary object of this invention is to provide a tool for cutting circular sections in sheet material by attaching said tool to a drill press or any other similar rotating tool of standard design.

Another object of the invention is to provide a cutting tool such as mentioned above in which the actual cutting units are adjustable to any diameter within practical working limits.

Another object of the invention is to provide means by which annular sections can be cut in sheet material by cutting several concentric circles simultaneously.

And yet another object of the said invention is to provide an economical and compact circular cutting attachment which may be attached to standard machine-shop equipment thereby eliminating the cost of and space occupied by large individual machines for that purpose.

The foregoing objects together with others will be apparent from the following description considered in connection with the attached drawings in which—

Figure 1 is a partial plan of the invention; Figure 2 is an elevation of the invention; and Figure 3 is a detail of the centering device; and Figure 4 shows a variation in the cutting tool.

Similar numerals refer to similar parts throughout the several views.

The central shaft 4 by means of which the cutter is attached to a drill press through the medium of a chuck or taper, the upper and lower plates 5 and 7, respectively, and the four separating walls 9, constitute the framework of the cutter. The upper plate 5 is provided with ribs 6 for reinforcement purposes, and the lower plate 7 is provided with slots 8 to permit the travel of the cutter holders 1.

The cutting of circular holes or sections is accomplished by means of circular sharp-edged disks 3, by compressing the said cutters or disks 3 against the sheet to be cut, in the usual manner after the said attachment has been attached to the spindle of the drill press. The disks 3 are rotatably supported by a clevis-like holder 2 which is in turn inserted into the adjustable cutter holders 1, and held rigidly therein by set screws or similar fasteners.

The adjustable cutter holders 1 are arranged symmetrically about the central shaft 4 so that the axis of one pair of said holders is at right angles to the axis of the other pair of said holders. In Figure 1 is shown a circular cutting attachment having four cutting units (for space economy, one identical cutting unit has been omitted in the drawing of the plan). However, any suitable number of such cutting units may be incorporated into the attachment, such units being symmetrically spaced about and radiating from the central shaft 4.

The distance between the cutters and the center of the attachment is adjusted by means of bolts 10 which pass through a hole 13 in the walls 9, through a tapped hole 20 in the holders 1, and are loosely embedded for a short distance into the wall of the central shaft 4. The bolt 10 is provided with an annular groove into which fits a split washer 14. The said washer is attached to the wall 9 and thereby prevents the movement of the bolt 10 in and out of the wall 9. The bolt 10 is also provided with a large knurled head 11 to facilitate the turning of the bolt 10. The turning of the said bolt in either direction causes the holder 1 with its attached cutter 3 to move to and from the central shaft 4, thereby adjusting the cutting radius. When the cutters have been adjusted to their right position, their respective bolts are locked in position by means of wing nuts 12.

To provide stability against rotation of the holders 1 with the turning of their contained adjustment bolts 10, and also to provide additional guidance to the said holders, an upper and lower guiding rod is provided to each of the said holders. The upper guiding rod 15 is anchored in the wall 9 and in the wall of the central shaft 4, and passes through a hole in the upper end of the holder 1. The lower guiding rod 15' is similarly anchored and it passes through a hole in the lower end of the holder 1.

To provide further stability to the holders 1 and to allow more accurate adjustment, a spring 16 is wound around each of the guiding rods 15 and 15' and is held in compression between the central shaft 4 and the inner face of each of the holders 1.

The central shaft 4 constitutes the spindle of the attachment. It may be tubular and of uniform diameter throughout its entire length, or it may taper towards its end for attachment to a standard drill press spindle. The shaft 4 has a hollow interior 17 which terminates into a hole 21 at the bottom end of the said shaft. The hole 21 is of a smaller diameter than 17.

The hollow shaft 4 contains a centering device comprising a pointed pin 19 which is free to pass through the hole 21, and a weighted part 22 which is the upper part of said pin. The part 22 is slightly smaller in diameter than the hollow section 17 so that it is free to slide therein but is too large to pass through the hole 21.

The framework of the attachment is held together by a series of screws 18 which pass through the upper and lower plates 5 and 7 respectively, and screw into the walls 9. Other rigid parts of the said attachment are either spot welded, force fitted, or similarly attached to the framework in their respective positions.

The operation of the invention consists of attaching the circular cutter to a standard drill press by fastening the shaft 4 to the chuck or sleeve of the spindle. The material to be cut is placed upon the table of the press and centered by means of the retractible centering point 19. The press is set into rotation and the lever hand feed is pressed down so that the cutting disks 3 press into the material to be cut. The pressure on the feed lever is applied until the material is cut through. A plurality of such cutting disks all set to the same diameter will of course increase the cutting speed of the attachment, while such cutting disks adjusted to different diameters or radii, will cut a series of concentric circles.

A rapid shearing action may also be provided to the cutter by inserting the material to be cut between an opposing pair of such circular cutting attachments, in which case the press would have to be provided with a suitable table to accommodate the inverted attachment.

The centering device as shown in Figure 3 of the drawings, is to be used strictly as such. It has no pivoting value, and is made retractible so that the pressure applied to the cutting attachment will not cause it to penetrate the material which is being cut, and the said centering point will not become distorted after several applications of the device.

For cutting metals of heavy gauge, the cutters 3 with their brackets 2 can be replaced by a tool holder 23 into which is inserted in the usual manner a standard cutting tool 24, as shown in Figure 4.

It is obvious that changes may be made in the device by those skilled in the art without departing from the essentials of the invention, I therefore do not consider the invention limited to the specific construction shown by way of example in the above specification, but what I claim is:

1. A circular cutting attachment for a drill press comprising an upper plate reinforced with ribs radiating from its center, a lower corresponding plate provided with a plurality of symmetrically spaced slots, a plurality of sectional walls separating said plates, a central hollow shaft having at the upper end thereof a taper for attachment to a drill press spindle, attached to said plates extending upwardly beyond the upper plate and terminating with the lower plate, the above items constituting the framework of said attachment; a plurality of symmetrically spaced adjustable cutter holders contained within said framework and extending through the slots in the lower plate, a corresponding number of circular rotating cutting disks, one attached to each of said holders; threaded adjustable bolts passing through and rotatably held against the walls of the framework, said bolts being rotatably supported at their other ends by the central shaft and being screwed through tapped holes in the said cutter holders, said bolts being further provided with knurled heads and lock nuts; and each of said cutter holders being guided by a pair or guide bars which pass through said cutter holders and are anchored by the framework wall and the central shaft.

2. A circular cutting attachment such as described in claim 1 provided with a spring wound about each of said guide bars, and said spring being held in compression between the inner face of said cutter holder and the said central shaft.

3. A circular cutting attachment such as described in claim 1, the central shaft being provided with a retractible centering device comprising a weighted pin which hangs by means of gravity from the bottom end of the said central shaft and which slides into the hollow interior of the said shaft when pressure is applied to the point of said centering device.

4. In a drill-press attachment, a circular cutting means comprising an upper plate reinforced with ribs radiating from its center, a lower corresponding plate provided with a plurality of symmetrically spaced slots, a plurality of sectional walls separating said plates, a central hollow shaft having at the upper end thereof a taper for attachment to a drill-press spindle, attached to said plates extending upwardly beyond the upper plate and terminating with the lower plate, the above items constituting the framework of said attachment; a plurality of symmetrically spaced adjustable cutter holders contained within said framework and extending through the slots in the lower plate, a corresponding number of circular rotating cutting disks, one attached to each of said holders; threaded adjustable bolts passing through and rotatably held against the walls of the framework, said bolts being rotatably supported at their other ends by the central shaft and being screwed through tapped holes in the said cutter holders, said bolts being further provided with knurled heads and lock nuts; and each of said cutter holders being guided by a pair of guide bars which pass through said cutter holders and are anchored by the framework wall and the central shaft, and the said central shaft being provided with a retractible centering device comprising a weighted pin which hangs by gravity from the bottom end of said central shaft and which slides into the hollow interior of the said shaft when pressure is applied to the point of said centering device.

PAUL EUCLID RIVEST.

REFERENCES CITED

The following references are of record in the file of this patent:

UNITED STATES PATENTS

| Number | Name | Date |
|---|---|---|
| 1,537,376 | Prosser | May 12, 1925 |
| 1,746,463 | Elder | Feb. 11, 1930 |
| 2,368,908 | Witter | Feb. 6, 1945 |